United States Patent [19]

Berends et al.

[11] Patent Number: 4,971,190
[45] Date of Patent: Nov. 20, 1990

[54] CONVEYOR CROSS SWITCH

[75] Inventors: Howard Berends, Fruitport, Mich.; Thomas L. Garzelloni, Worth; Harry Houghton, Orland Park, both of Ill.

[73] Assignee: Automotion, Incorporated, Worth, Ill.

[21] Appl. No.: 414,766

[22] Filed: Sep. 29, 1989

[51] Int. Cl.⁵ .............................................. B65G 47/46
[52] U.S. Cl. .................................... 198/370; 198/372
[58] Field of Search ........................ 198/365, 370, 372

[56] References Cited

U.S. PATENT DOCUMENTS

| | | | |
|---|---|---|---|
| 3,986,596 | 10/1976 | Hamilton | 198/365 |
| 4,637,508 | 1/1987 | Kikuchi et al. | 198/365 |
| 4,717,011 | 1/1988 | Yu et al. | 198/372 X |
| 4,732,259 | 3/1988 | Yu et al. | 198/372 X |
| 4,738,347 | 4/1988 | Brouwer et al. | 198/372 |
| 4,760,908 | 8/1988 | Houghton | 198/372 X |

Primary Examiner—Joseph F. Valenza
Assistant Examiner—D. Glenn Dayoan
Attorney, Agent, or Firm—Wood, Phillips, Mason, Recktenwald & VanSanten

[57] ABSTRACT

A switch assembly consisting of a first surface for guiding a guide element in a first path, a second surface for guiding a guide element in a second path that crosses the first path, a first opening in the first guide surface for permitting passage therethrough of a guide element moving along the second surface in the second path, a second opening in the second guiding surface for permitting passage therethrough of the guide element moving along the first surface in the first path, a support for the first and second guiding surfaces, a cam actuator mounted for movement relative to the support between first and second positions, a switching wall mounted for movement relative to the support between a first position wherein it blocks the first opening and a second position wherein it blocks the second opening, cooperating structure on the cam actuator and switching wall for moving the wall from its first position to its second position as an incident of the cam actuator moving from its second position to its first position and for moving the switching wall from its second position to its first position as an incident of the cam actuator moving from its first position to it second position. The cam actuator is engagable by a guide element of predetermined size to cause movement of the cam actuator from its first position to its second position as an incident of the guide element moving the first path. The guide element engages the cam actuator to move the cam actuator from its second position to its first position as an incident of the guide element moving in the second path.

16 Claims, 3 Drawing Sheets

CONVEYOR CROSS SWITCH

BACKGROUND OF THE INVENTION

1. Field of the Invention

This invention relates to article conveyors of the type having article carrying tubes moving in an endless path and pushers movable lengthwise of the tubes to divert articles off of the conveyor and, more particularly, to a control switch for crossing track sections that guide movement of the pushers.

2. Background Art

One conventional type of article conveying system utilizes a plurality of elongate tubes moving in an endless path transverse to the length of the tubes. An exemplary system is shown in U.S. Pat. No. 4,760,908, to Houghton. In such systems, the articles are carried on top of the tubes and diverted to selected stations by pushers moving lengthwise of the tubes as the conveyor is operated. Each pusher has a depending guide element which cooperates with a guide track system and is thereby progressively deflected lengthwise of the tube.

In some such systems, there are crossing track portions. This permits the articles to be pushed selectively off either side of the tubes over the same conveyor length. The crossing arrangement accounts for a significant savings in conveyor and thus warehouse space, however necessitates the incorporation of a switch to selectively guide the pushers to either one side or the other of the conveyor.

Heretofore, switches have been controlled by a combination of electronic and mechanical components. Typically, a photosensor will detect an article and in response thereto produce a signal that dictates the position of the switch.

The problem with the above type switch is that, while it may be relatively sophisticated, it is prone to failure. If for any reason there is a misread by the photosensor, the switch could be thrown into the wrong position which could result in misdirection of articles, jamming and potential damage to the system. Down time and improperly sorted articles are inconvenient and expensive to the user of the conveyor.

SUMMARY OF THE INVENTION

The present invention is specifically directed to overcoming the above-enumerated problems in a novel and simple manner.

The present invention has, as its principal objective, the provision of a mechanical switching system that coacts directly with a guide element on a pusher which positively and consistently controls the switch.

According to the invention, a switch assembly is provided consisting of a first surface for guiding a guide element in a first path, a second surface for guiding a guide element in a second path that crosses the first path, a first opening in the first guide surface for permitting passage therethrough of a guide element moving along the second surface in the second path, a second opening in the second guiding surface for permitting passage therethrough of the guide element moving along the first surface in the first path, a support for the first and second guiding surfaces, a cam actuator mounted for movement relative to the support between first and second positions, a switching wall mounted for movement relative to the support between a first position wherein it blocks the first opening and a second position wherein it blocks the second opening, cooperating structure on the cam actuator and switching wall for moving the wall from its first position to its second position as an incident of the cam actuator moving from its second position to its first position and for moving the switching wall from its second position to its first position as an incident of the cam actuator moving from its first position to its second position. The cam actuator is engagable by a guide element of predetermined size to cause movement of the cam actuator from its first position to its second position as an incident of the guide element moving in the first path. The guide element engages the cam actuator to move the cam actuator from its second position to its first position as an incident of the guide element moving in the second path.

In a preferred form, the cam actuator and switching wall are mounted for pivoting movement relative to the support about first and second parallel axes. An elongate rod is pivotably connected at its end to the switching wall and cam actuator. The pivot axes for the rod ends are parallel to each other and the first and second axes.

To assure that the cam actuator and switching wall are positively moved into each of their first and second positions, an overcenter biasing structure is provided. The overcenter structure preferably consists of a stretched coil spring which connects between the support and cam actuator and draws the cam actuator positively into each of its first and second positions.

Another aspect of the invention is the provision of structure to prevent rattling and undue wear on the cam element. Slots are provided in spaced positions on the cam actuator. The guide element has a stem which moves into one of the slots to thereby control pivoting movement of the cam actuator between its first and second positions. The stem smoothly enters into and releases from the one slot as it moves in the first path and cooperates in the same way with the other slot as the guide element moves in the second path. This prevents the cam actuator from being abruptly thrown as it encounters the moving guide element.

To further diminish noise in the system, the cam actuator is preferably made from a plastic material so that metal-to-metal contact between the guide element and cam actuator is avoided.

DETAILED DESCRIPTION OF THE DRAWINGS

Figure 1:
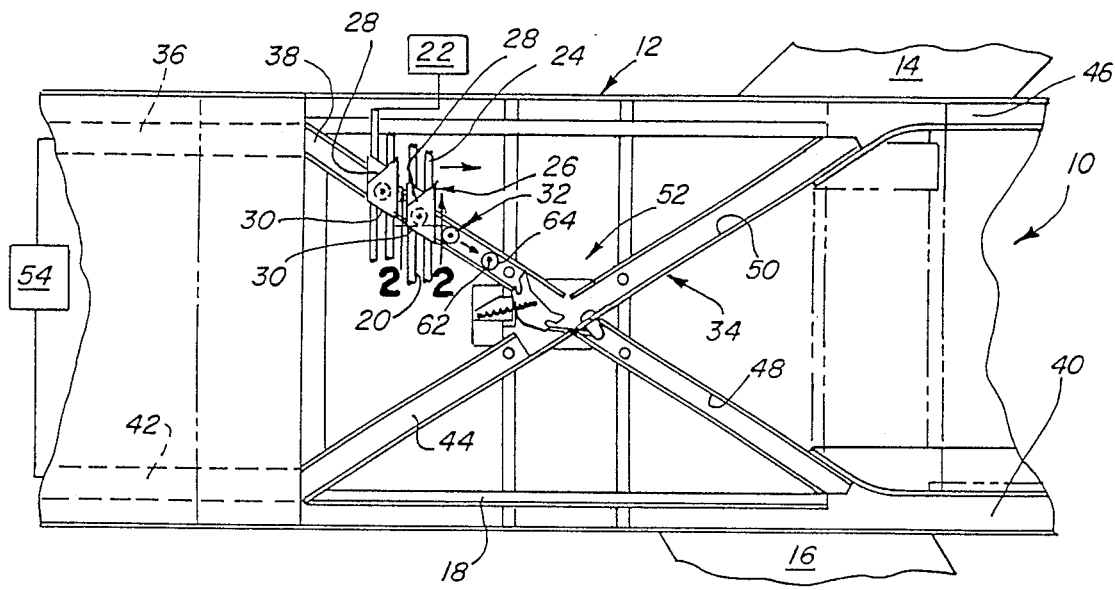
FIG. 1 is a plan view of an article conveying system with diverting pushers movable in crossing guide tracks and a switch assembly according to the present invention incorporated therein.

A conveying system according to the present invention is shown at 10 in FIG. 1. The details of the system are described more fully in U.S. Pat. No. 4,760,908, to Houghton, incorporated by reference herein.

The conveying system 10 consists of a primary conveyor 12, which directs articles from left to right in FIG. 1, and secondary conveyors 14, 16, on opposite sides of the primary conveyor 12. The primary conveyor 12 has a frame 18 to which a plurality of article carrying tubes 20 are mounted for movement in an endless path. The tubes 20 are moved in the endless path by a conventional drive, shown schematically at 22.

Figure 2:
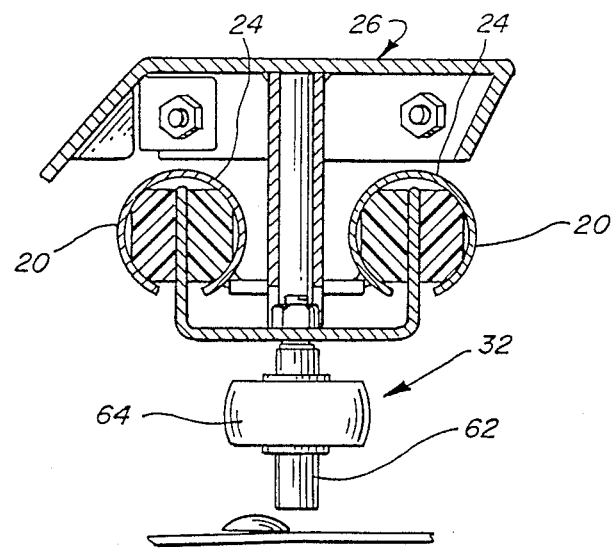
FIG. 2 is a section view of a pusher on the conveyor system taken along line 2—2 of FIG. 1.

Each carrying tube 20 has an upwardly facing surface 24 on which conveyed articles are supported. The tubes 20, in the embodiment shown, are mounted in pairs and have associated pushers at 26 (see also FIG. 2), which are slidable lengthwise of the tubes 20. Details of the connection between the pushers 26 and tubes 20 are described fully in U.S. Pat. No. 4,760,908.

The pushers 26 have laterally oppositely facing surfaces 28, 30 which bear against articles to effect diversion either to the secondary conveyor 14 or the opposite conveyor 16.

Movement of the pushers 26 lengthwise of the tubes 20 is controlled by the cooperation of a guide element 32, depending from each pusher 26, and a guide track system 34. The guide track system 34, shown in FIG. 1, consists of two upwardly opening U-shaped guide channels. The first guide channel consists of a straight track section 36, a track section 38 that moves diagonally across the conveyor 12, and a second straight track section 40 on the right side of the conveyor in FIG. 1. A separate straight track section 42 connects with a second diagonal track section 44 and in turn straight track section 46.

In operation, pushers 26 moving along track section 36 are each guided therein by the guide element 32, which encounters guiding surface 48 on the channel section 38, as it moves from left to right in FIG. 1, thereby shifting the pushers 36 from top to bottom in FIG. 1 until the guide element 32 moves into the track section 40. A guide element 32, moving in track section 42 in FIG. 1, encounters guiding surface 50 on the track section 44 and is thereby shifted with its associated pusher 26 from bottom to top in FIG. 1 and into section 46.

The track sections 36, 38, 40, 42, 44, 46 interconnect through a portion of the system 10 that is not shown in the drawings. The present invention is focused on a switch assembly/mechanism 52 at the juncture of the crossing track sections 38, 44. It is not necessary to describe that portion of the system that is not shown in the drawings. It suffices to say that a programmed controller, shown schematically at 54 in FIG. 1, dictates whether the guide elements 32 on the pushers 26 move into the track section 36 or the track section 42. It is desirable that if the guide element 32 moves in track section 36 it be guided smoothly along diagonal track section 38 and likewise that if the pusher element moves into track section 42 it be movable smoothly along the track section 44. This is facilitated by the switch assembly/mechanism at 52.

Figure 3:
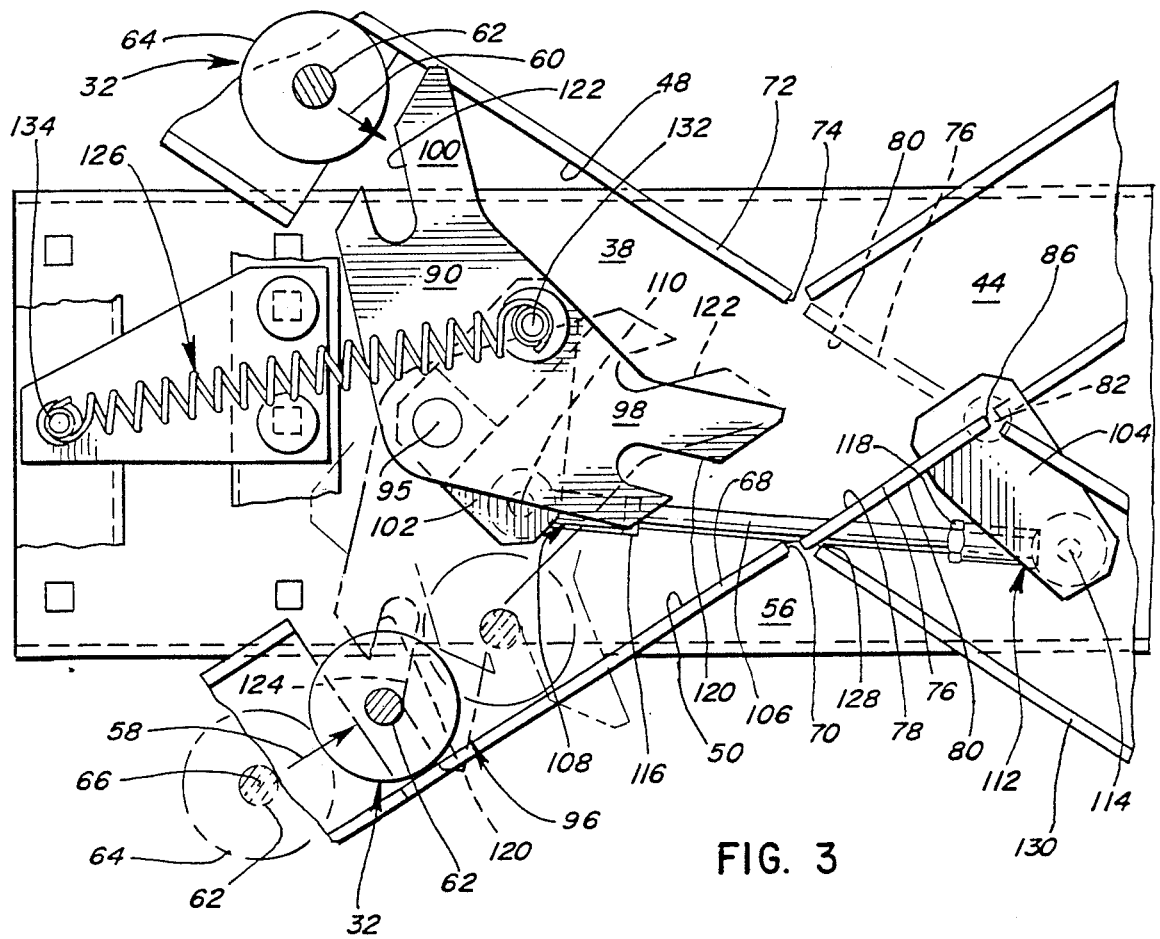
FIG. 3 is an enlarged, plan view of the switch assembly in FIG. 1.
Figure 4:
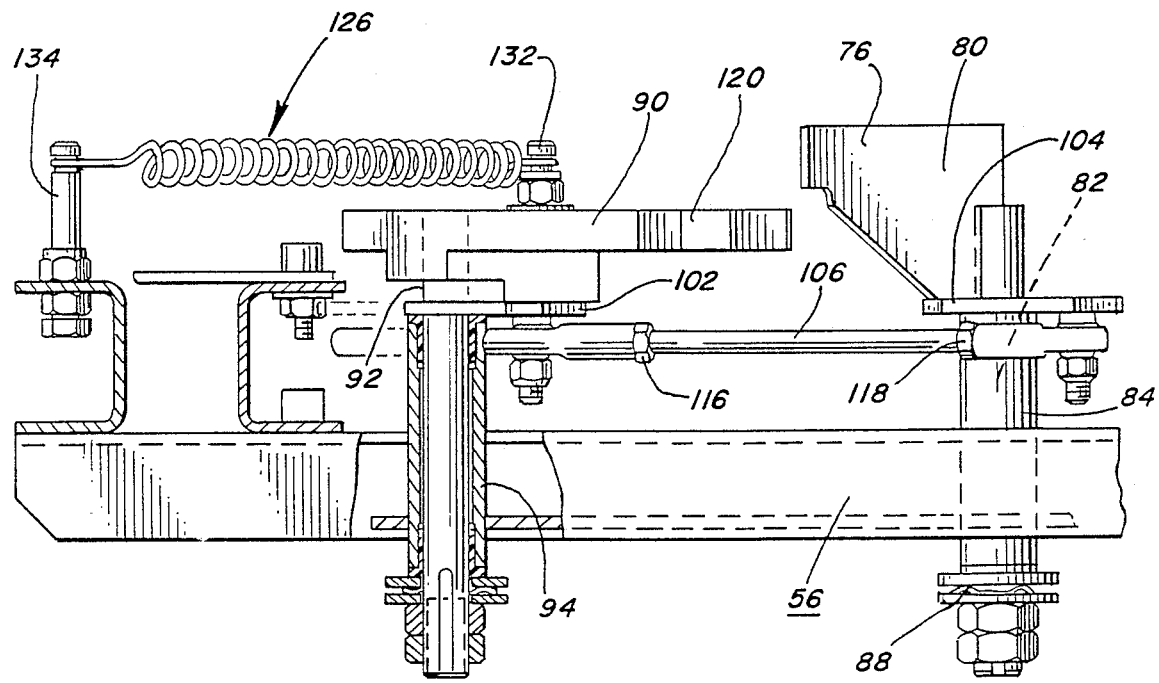
FIG. 4 is an enlarged, elevated, side view of the switch assembly in FIG. 3.

In FIGS. 3 and 4, the switch assembly 52 is enlarged and shown in detail. The switch assembly 52 is mounted on a fixed support 56 associated with the conveyor frame 18. The diagonal track sections 38, 44 are mounted to the support 56 where they cross each other.

In operation, the guide element 32 and associated pusher 26 move in a substantially linear first path as indicated by the arrow 58, in channel 44, or in a linear second path, indicated by arrow 60, along track section 38. In a preferred form, the guide element 32 has a stem 62 on which a rubber roller 64 is journalled for rotation about a vertically extending axis 66. In the first path, the roller 64 moves against guiding surface 50 on the rail section 44. In the second path, the roller 64 moves against guiding surface 48 on track section 38.

The wall 68, defining the surface 50, has an opening 70 therein to permit the guide roller 64 to move through the wall 68 as it travels in the second path. Similarly, the wall 72 on the track section 38 has an opening 74 to permit movement of the roller 64 through the wall 72 as the roller 64 moves in the first path along track section 44.

According to the present invention, the roller 64 and associated stem 62 will trip the switch mechanism 52 to move the wall 76 selectively between the solid line and dotted line positions in FIG. 3. With the roller 64 moving in the first path, the wall 76 is moved to the solid line position wherein a flat surface 78 on the wall 76 aligns in coplanar relationship with the surface 50. With the roller 64 travelling in the second path, the switch mechanism 52 is operated to place an oppositely facing flat surface 80 on the wall 76 in coplanar relationship with the guiding surface 48.

The wall 76 has an associated shaft 82 which fits within and is guided for rotation relative to a cylindrical sleeve 84 on the support 56 about a vertical pivot axis 86. A wave washer 88 is provided on the bottom of the shaft 82 to controllably damp rotation of the shaft 82 and wall 76.

To move the wall 76 between its first and second positions, a cam actuator 90 is provided. The cam actuator 90 is preferably made from a piece of plastic material and has an associated shaft 92 which is journalled for rotation in a sleeve 94 about a vertically extending axis 95. The sleeve 94 is fixed to the support 56. The cam actuator 90 is pivotable between a first position, shown in dotted lines at 96 in FIG. 1, and a second position shown in solid lines in FIG. 3. The cam actuator 90 has a first arm 98, which cooperates with a roller 64 and stem 62 moving in the first path with the cam actuator 90 in its first position, and a second arm 100, which cooperates with a roller 64 and stem 62 moving in the second path with the cam actuator 90 in its second position.

The cam actuator 90 and wall 76 are interconnected so that movement of the cam actuator 90 from its first position to its second position causes movement of the wall 76 from its second position to its first position. The interconnecting structure consists of a flat flange 102 underneath the cam actuator 90, which flange 102 rotates with the cam actuator 90. A flat flange 104 rotates with the wall 76. An elongate rod 106 is connected between the flanges 102, 104. The one rod end 108 is connected to the flange 102 for pivoting movement about a vertically extending axis 110 that is spaced from the axis 95. The opposite rod end 112 is connected to the flange 104 for pivoting movement about a vertical axis 114 spaced from the axis 86 of the wall 76. Adjusting nuts 116, 118 are provided to vary the effective overall length of the rod 106 to control the relative positions of the cam actuator 90 and switching wall 76.

With the cam actuator 90 in its second position, shown in solid lines in FIG. 3, rotation of the cam actuator 90 in a clockwise direction causes the rod 106 to exert a clockwise rotative force on the flange 104 and in turn the wall 76 to move the wall 76 from the solid line position in FIG. 3 to the phantom line position. Reverse pivoting of the cam actuator 90 changes the position of the wall 76 from the phantom line position to the solid line position of FIG. 3.

The roller 64 and stem 62 cooperate with the cam actuator 90 to move the cam actuator 90 between its first and second positions. An elongate slot 120 is provided in arm 98 and a like slot 122 is provided in arm 100 to cooperate with the stem 62. With the roller 64 and stem 62 moving in the first path, and the cam actuator in the first position, the stem 62 encounters a cam actuator surface 124, bounding the slot and at an angle with respect to the line of the first path. The stem 62, as it moves further to the right in FIG. 3, progressively moves into the slot 120 and as it moves along surface 124 cams the actuator 90 in a counterclockwise direction. The stem 62 moves progressively into the slot 120 as the roller 64 advances and, after moving into the bottom of the slot 120, moves progressively out of the slot 120 as the cam actuator 90 rotates further until the stem 62 moves out of the slot 120 altogether and therafter separates from the cam actuator 90.

Once the stem 62 has pivoted the cam actuator 90 a predetermined distance, an overcenter spring 126 draws the cam actuator 90 positively into its second position. The cam actuator 90 is consistently blocked in its second position by the wall surface 80 which abuts a corner 128 on a wall 30 of the track section 38. The spring 126 is stretched between a post 132 on the cam actuator 90 and spaced from the pivot axis 95 for the cam actuator, and a post 134 fixed to the support 56.

As the roller 64 and stem 62 move in a second path in the track section 38, with the cam actuator 90 in its second position, the stem 62 cooperates with the arm 100 of cam actuator 90 and slot 122 therein in the same manner as with the other arm 98 and slot 120 to effect movement of the cam actuator 90 from its second position to its first position, and, as an incident thereof, movement of the wall 76 from its first position to its second position.

Figure 5:
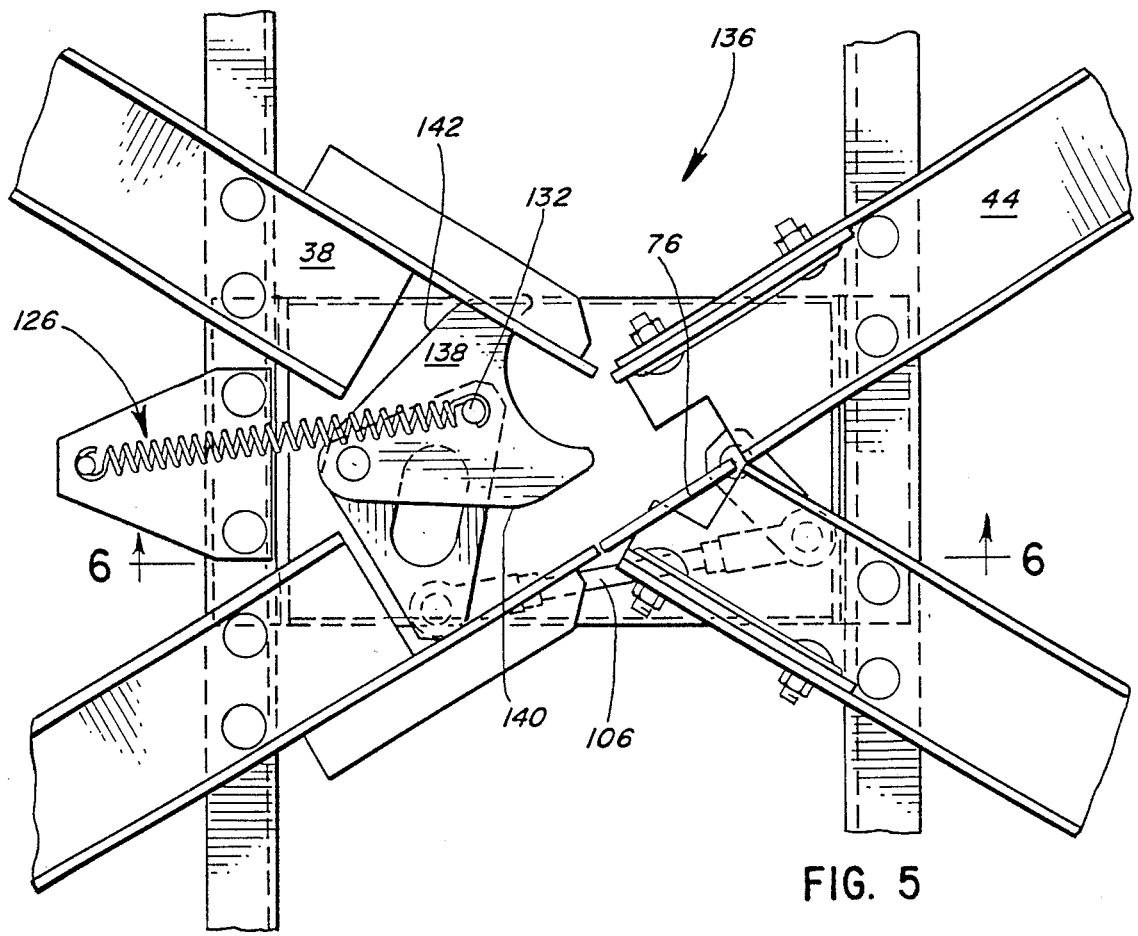
FIG. 5 is a plan view of a modified form of switch assembly according to the present invention.
Figure 6:
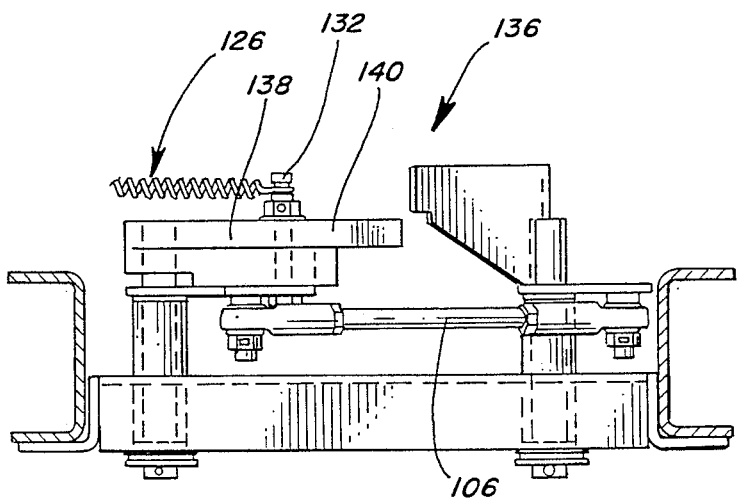
FIG. 6 is a section view of the switch assembly taken along line 6—6 of FIG. 5.

FIGS. 5 and 6 show a modified form of the invention. The switch assembly at 136 in FIGS. 5 and 6 is substantially the same as that in FIGS. 3 and 4 with the exception of the configuration of a cam actuator 138 therein. The cam actuator 138 has oppositely facing surfaces 140, 142 which engage the guide element stem 62 to pivot the cam actuator 138 between corresponding first and second positions, which in turn effects pivoting of the wall 76 between its first and second positions. The only significant difference in the operation of the cam actuator 138 from that at 90 in FIGS. 3 and 4 is that there is no slot in the walls 140, 142. Consequently, the rotation of the cam actuator 138 is not controllably guided by the stem 62 in the same manner as in the FIGS. 3 and 4 embodiment.

The foregoing disclosure of specific embodiments is intended to be illustrative of the broad concepts comprehended by the invention.

We claim:

1. A switch assembly comprising:
 a first surface for guiding a guide element in a first path;
 a second surface for guiding a guide element in a second path that crosses said first path,
 said first guiding surface having a first opening for permitting passage therethrough of a guide element moving along said second surface in said second path,
 said second guiding surface having a second opening for permitting passage therethrough of a guide element moving along said first surface in said first path;
 a support for said first and second guiding surfaces;
 a cam actuator mounted for movement relative to the support between first and second positions;
 a switching wall mounted for movement relative to the support between (a) a first position wherein it blocks the first opening and (b) a second position wherein it blocks the second opening;
 cooperating means on the cam actuator and switching wall for selectively (a) moving the wall from its first position to its second position as an incident of the cam actuator moving from its second position to its first position and (b) moving the switching wall from its second position to its first position as an incident of the cam actuator moving from its first position to its second position;
 first means on the cam actuator for engagement by a guiding element of predetermined size to cause movement of the cam actuator from its first position to its second position as an incident of said guide element moving in said first path; and
 second means on the cam actuator for engagement by said guiding element to cause movement of the cam actuator from its second position to its first position as an incident of said guide element moving in said second path.

2. The switch assembly according to claim 1 wherein said cam actuator is mounted to said support for pivoting movement between its first and second positions.

3. The switch assembly according to claim 1 wherein said switching wall is mounted to said support for pivoting movement between its first and second positions.

4. The switch assembly according to claim 1 wherein said cam actuator is mounted to said support for pivoting movement about a first axis between its first and second positions, the switching wall is mounted to the support for pivoting movement about a second axis between its first and second positions, said first and second axes being parallel to each other, and the cooperating means on the cam actuator and switching wall includes an elongate rod with opposite ends, one said rod end being pivotably connected to the cam actuator and the other rod end being pivotably connected to the switching wall.

5. The switch assembly according to claim 1 including overcenter means for biasably moving the cam actuator into each of its first and second positions.

6. The switch assembly according to claim 1 wherein said first means on the cam actuator includes a slot for reception of a part of said a guide element, said guide element part moving in and out of the slot as the guide element is moved along the first path and the cam actuator is moved from its first position to its second position.

7. The switch assembly according to claim 1 wherein said cam actuator is made from a plastic material.

8. The switch assembly according to claim 4 wherein the pivot axes for the rod ends are each parallel to the first and second axes.

9. The switch assembly according to claim 5 wherein said overcenter means comprises a first post on said support and a second post on the cam actuator and a coil spring under tension connected to said first and second posts.

10. A conveyor system comprising:
 a plurality of elongate article supporting tubes moving in an endless path as the conveyor is operated;

at least one article pusher mounted to at least one of the tubes for movement lengthwise relative thereto to divert articles along the length of said one tube as the conveyor is operated;

a guide element on said article pusher;

guide means cooperating with the pusher guide element for moving the article pusher in a predetermined manner relative to said one tube as the conveyor is operated, said guide means including first and second crossing guide tracks, said first guide track having a first surface for guiding the guide element in a first path, said second guide track having a second surface for guiding the guide element in a second path, said first guiding surface having a first opening for permitting passage therethrough of the guide element moving along said second guiding surface in said second path, said second guiding surface having a second opening for permitting passage therethrough of a guide element moving along said first surface in said first path; and mechanical switch means for blocking said first opening as an incident of said guide element moving in said first path to thereby prevent movement of said guide element through said first opening as it travels in said first path and for blocking said second opening as an incident of said guide element moving in said second path to thereby prevent movement of said guide element through the second opening as it travels in the second path.

11. The conveyor system according to claim 10 wherein a support is provided, said switch means includes a cam actuator which is mounted to the support for movement between first and second positions, said cam actuator in said first position having a portion that resides in the line of the guide element moving in the first path and in said second position having a portion that resides in the line of the guide element moving in the second path, said switch means further including a switching wall mounted to the support for movement between (a) a first position wherein it blocks the first opening and (b) a second position wherein it blocks the second opening, cooperating means on the cam actuator and switching wall for moving the switching wall from its first position to its second position as an incident of the cam actuator moving from its second position to its first position and for moving the switching wall from its second position to its first position as an incident of the cam actuator moving from its first position to its second position, and cooperating means on the cam actuator and guide element for moving the cam actuator from its first position to its second position as an incident of the guide element moving in the first path and for moving the cam actuator from its second position to its first position as an incident of the guide element moving in its second path.

12. The conveyor system according to claim 11 wherein said guide element has a stem, said cam actuator has a slot to receive the stem, said stem moving into and out of the slot as the guide element moves in one of said first and second paths and thereby moves the cam actuator between its first and second position.

13. The conveyor system according to claim 11 including overcenter means for biasing the cam actuator into each of its first and second positions.

14. The conveyor system according to claim 11 wherein said cam actuator is pivotably moved about a first axis between its first and second positions, and the switching wall is pivotably moved about a second axis between its first and second position.

15. The conveyor system according to claim 14 wherein said cooperating means on the cam actuator and switching wall includes an elongate rod with opposite ends, said rod ends being secured to the switching wall and cam actuator.

16. The conveyor system according to claim 15 wherein the pivot axes for the rod ends are parallel to each other and the first and second pivot axes.

* * * * *